Patented Dec. 12, 1944

2,364,900

UNITED STATES PATENT OFFICE 2,364,900

ACETONE RESIN COMPOSITIONS AND PROCESS OF MAKING SAME

Frederick A. Hessel, Upper Montclair, and John B. Rust, Verona, N. J., assignors to Ellis-Foster Company, a corporation of New Jersey No Drawing. Application January 9, 1941, Serial No. 373,798

7 Claims. (Cl. 260—42)

This invention relates to a water-soluble acetone-formaldehyde condensation product and particularly to heat-hardenable compositions containing a water-soluble acetone-formaldehyde condensation product and water-soluble formaldehyde-condensable nitrogenous bodies.

As hitherto practised, when 1 molecular equivalent of acetone is combined with 6 molecular equivalents of formaldehyde under alkaline conditions, a more or less light-colored resinous material is obtained which is insoluble in water but, depending upon the degree of reaction and possibly upon the amount of strong alkali catalyst, it is either light-yellow and insoluble in all organic solvents (Plauson, German Patent 351,349) or is light-colored and soluble in alcohol and the like (Ellis, U. S. Patent 1,683,535). The alcohol-soluble product when heated (and particularly when heated with caustic alkali) is converted to an insoluble heat-resistant body. We have found that acetone and formaldehyde in the proportions of 1 mole acetone to 6 moles formaldehyde can be condensed to yield a hard, water-soluble, alcohol-insoluble resin which when heated alone or with added alkali remains water-soluble and fusible. Although permanent water-solubility is often undesirable, we have found that if the resin is mixed with water-soluble nitrogenous bodies of a type hereinafter explained, a composition is obtained which when heated becomes hardened, that is, it becomes insoluble and infusible.

The alcohol-soluble (water-insoluble) condensation product of 1 mole of acetone and 6 moles of formaldehyde has been incorporated with urea-formaldehyde solutions (Ellis, U. S. Patent 2,029,525). Also, various water- and alcohol-soluble acid-condensation products of acetone with low molecular amounts of formaldehyde (from .2 to 2.6 moles of formaldehyde per mole of acetone) have been incorporated with certain synthetic resins, proteins, etc. (Novotny and Vogelsang, U. S. Patent 2,191,802). Furthermore, it may be noted that water-soluble, potentially hardenable condensation products of acetone with relatively low molecular proportions of formaldehyde have been applied as a size to fabrics and baked thereon to render them shrink resistant (Zwicky and Brunner, U. S. Patent 2,159,875).

It is an object of this invention to prepare compositions containing a permanently water-soluble and fusible acetone resin and admixed nitrogenous bodies, which compositions are hardenable under heat. It is also an object to prepare aqueous compositions or solutions containing the water-soluble acetone-formaldehyde condensation product and a water-soluble nitrogenous body for use as coating compositions, adhesives, cements, paper and textile sizes, binders for molding compositions to produce molded articles including pressed cork products, and the like. A particular object is to prepare aqueous compositions which can be applied to textile materials to produce a permanent finish thereon and improve them in such qualities as draping. Other objects will appear hereinafter.

The acetone-formaldehyde product which we use is obtained by refluxing 1 molecular equivalent of acetone and 6 molecular equivalents of formaldehyde in the presence of a substantial amount of a very mild alkaline condensing agent such as disodium phosphate or borax, the condensing agent being a compound whose aqueous solution shows a pH of around 9.5. The reaction mixture remains homogeneous throughout the heating and an advantage of the procedure is that the reaction is easily controlled. After refluxing for some hours, water is removed (preferably under reduced pressure in order to preserve the water-white color) and the final product is obtained as a hard transparent resin soluble in water and which does not harden when heated alone or with a strong alkali. The resin is not soluble in ethyl alcohol in a practical sense. For example, a mixture of equal parts resin and alcohol on standing shows a two-phase system. The lower phase is viscous liquid (resin softened by absorption of alcohol). The upper phase is alcohol. When shaken a turbid emulsion-like liquid is obtained. The resin as prepared still contains the alkaline condensing agent and, therefore, subsequent hardening in the presence of the nitrogenous body occurs under mild alkaline conditions.

Acetone is the preferred ketone from which to make the resin although higher ketones such as methyl ethyl ketone can be substituted, at least partially, for acetone. Aqueous formaldehyde is an advantageous form of the aldehyde since aqueous compositions are concerned, but polymeric formaldehyde can also be used. The resin will hereinafter be designated "water-soluble acetone resin."

The following is a preferred formula for making the resin:

A mixture of 145 parts of acetone, 1200 parts of 37.5% aqueous formaldehyde and 60 parts of borax were refluxed together for 6 hours, after which an additional 60 parts of borax was added and refluxing was continued for 6 hours. The product was then dehydrated on a water bath under reduced pressure to give a water-white, hard, brittle, transparent resin, soluble in water, insoluble in alcohol and which when heated at 140° C. for 2 hours or more is still water-soluble. Heating the resin at 140° C. in the presence of caustic soda causes no darkening and also does not produce water-insolubility.

Although it is advantageous for convenience in handling to completely dehydrate the resin as above, it is possible to use the aqueous reaction mixture or partially to dehydrate the same.

Nitrogenous bodies with which the water-soluble acetone resin may be mixed to yield heat-hardenable compositions include proteins such as gelatin, casein, glue; amides, such as urea and thiourea; melamine, dicyandiamide; and water-soluble intermediate or partial condensation products of urea, thiourea, melamine or dicyandiamide with formaldehyde, the latter group including these compounds reacted with insufficient formaldehyde to yield a condensation product which is capable in itself of hardening when heated. Mixtures of two or more compatible nitrogenous substances may be used if desired. These bodies are all condensable with formaldehyde to a hardened, substantially water-insensitive condition; also they are all water-soluble. It will be noted that the present invention involves two water-soluble substances either of which when heated alone does not harden but which when mixed and heated produce a mutual effect whereby a water-insoluble composite results. The water-soluble nitrogenous body is insolubilized (that is, fixed) by the acetone resin and vice versa. Although water-solubility is a requisite characteristic of the formaldehyde-hardenable nitrogenous bodies, in certain cases (for example, with melamine where water-solubility is less pronounced) it is desirable to add some alcohol to improve stability of the solution on storage. Also, the addition of a small amount of alcohol improves the flow of the aqueous compositions when films or coatings are desired.

Curing or fixing appears to be more rapid when it occurs when the composition is in contact with cellulosic material as when a composition is applied to cloth and subjected to elevated temperature. For example, a mixture of gelatin and acetone resin applied to cotton cloth from aqueous solution and the cloth dried and subjected to a temperature of 140° C. for 15 minutes yields a laundry-resistant filled material. A similar composition applied as a film to glass and baked for the same time and at the same temperature is still water-soluble and requires longer baking in order to be fixed. Curing temperature is above 100° C. and any temperature may be used between this point and about 170° C., the temperature in any case being below the thermal decomposition point. The higher the temperature the shorter the time required for fixation.

As mentioned previously, curing of the composition occurs under mildly alkaline conditions. This is particularly advantageous when textile treatment is concerned. It is known to treat fabrics with a solution of urea-formaldehyde condensation product and cure the resin on the fabric by heating. However, curing under acid conditions is necessary and this is liable to tender the cloth, particularly if fast curing is required.

Although certain substances such as urea and thiourea compositions, when used according to the present invention result in yellowing which precludes their use on white (but not darker colored) goods, it is possible (for example, with many proteins and melamine compositions) to obtain colorless cured materials. Equal parts of acetone resin and nitrogenous body are often satisfactory proportions although the amounts may be varied within certain limits. For example, the proportions may vary between 1 part of resin to from ¼ to 2 parts of the added nitrogenous body. It will be apparent that the amount of acetone resin necessary to use with the nitrogenous body in order to produce hardening is substantial, and is quite different than catalytic amounts. Hence, the term hardening agent as used in the claims denotes a reactant which adds materially to the composition weight.

The following examples are given to illustrate the foregoing. All parts are by weight.

*Example 1.*—A mixture containing 1 molecular proportion of melamine and 4 molecular proportions of formaldehyde as neutralized 37.5% aqueous aldehyde was heated under reflux until the melamine was dissolved and then heating was continued for 10 minutes. 355 parts of water-soluble acetone resin was mixed with 635 parts of the cooled syrup, which resulted in a clear liquid of high viscosity. The aqueous composition was applied to a glass panel to form a film. When the film was baked for 5 minutes at 140° C. it was insoluble in water. A similar film was insoluble in water when baked 3 minutes at 160° C.

*Example 2.*—635 parts of the melamine-formaldehyde solution described in Example 1 was added to 360 parts of water-soluble acetone resin, 732 parts of alcohol and 5350 parts of water to form a water-white solution containing approximately 10% solids. Cotton cloth was soaked in this solution, wrung on rubber rolls, air-dried and then baked at 140° C. for 15 minutes. After baking a marked stiffening of the cloth was noted which persisted after the cloth had been washed for 1 hour in a 1% soap solution at 95–100° C. Also no loss of body in the cloth was noted after soaking for 2 hours in carbon tetrachloride.

A composition similar to the above was made containing 25% instead of 10% solids. Films were poured on glass and baked at 130° C. for varying periods, after which water-solubility of the baked film was examined:

| | Minutes |
|---|---|
| Soluble in water | 5 |
| Partially soluble in water | 10 |
| Insoluble in water | 15 |

*Example 3.*—A melamine-formaldehyde reaction product in the form of a clear syrupy liquid was obtained by refluxing for about 10 minutes a mixture of 63 parts of melamine and 160 parts of neutral 37.5% aqueous formaldehyde. 20 parts of this syrup and 11.2 parts of water-soluble acetone resin were mixed to form a clear solution which was diluted with water to 100 parts. Cotton cloth was immersed in the solution for about 3 minutes, wrung between rollers and baked at 140° C. for 15 minutes. A definite stiffening effect on the cloth was obtained, which stiffening was retained after the treated cloth was washed in 1% soap solution at 100° C. for an hour.

*Example 4.*—5 parts of melamine was dissolved at 100° C. in 70 parts of an aqueous solution containing 10 parts of water-soluble acetone resin. 15 parts of alcohol was then introduced. Cotton cloth samples were immersed in this solution, wrung out and placed in an oven at 120° C. for lengths of time varying from ¾ hour to 2¼ hours. A stiffening of the cloth resulted. All samples were washed in 1% soap solution at 100° C. for an hour, followed by rinsing and drying. Each sample retained a stiffened effect after the washing treatment.

*Example 5.*—A solution containing 14.3% solids was made consisting of

| | Parts |
|---|---|
| Water-soluble acetone resin | 46 |
| Water | 232 |
| Denatured alcohol | 116 |
| Melamine | 12 |

Five samples of cotton cloth were immersed in this solution, wrung on rubber rollers, dried at 85° and baked at 140° C. for 5, 10, 15, 20 and 25 minutes, respectively. This resulted in a stiffening effect. All the samples were then given a soak of 1 hour in 1% aqueous soap solution at 95–100° C., then rinsed and dried by ironing. The 5-minute sample seemed to have lost all its bodying by the washing treatment. The 10-minute sample retained some stiffness and the other samples were found to be substantially unaffected by the washing.

*Example 6.*—Cotton cloth was soaked for 3 minutes in a solution consisting of 10 parts water-soluble acetone resin, 1 part gelatin and 100 parts water. The sample was wrung, dried at room temperature and then baked for 15 minutes at 140° C. A stiffening effect was obtained which persisted after heating for 1 hour in a 1% soap flake solution or after soaking for 2 hours in carbon tetrachloride. Films of the solution also were obtained on glass and baked at 140°. After 30 minutes at this temperature they were still soluble in water. The water-insolubility obtained on the treated cloth indicates the increased curing rate of the composition when in contact with cellulosic material.

*Example 7.*—10 parts of alkali casein and 10 parts of water-soluble acetone resin were dissolved in 80 parts of water. Cloth treated with this solution and baked at 100° C. for 30 minutes received a stiffening which was permanent to washing.

*Example 8.*—2 parts of animal glue and 2 parts of water-soluble acetone resin were dissolved in 96 parts of water. Cloth impregnated with this solution and baked at 100° C. for 30 minutes received a stiff finish which was retained after washing with hot soapsuds for an hour.

*Example 9.*—A series of compositions was made as listed below. The ingredients were dissolved in 20 parts of water containing 2 parts of water-soluble acetone resin. The water was driven off at 100° C. and the residues were heated at 140° C. for 15 minutes, after which they were examined for solubility in water.

A. 0.5 part melamine. Final product light yellow and insoluble in water.
B. 1.0 part melamine. Final product light yellow and insoluble in water.
C. 2.0 parts melamine. Final product light yellow and insoluble in water.
D. 3.0 parts melamine. Final product light yellow and insoluble in water.
E. 1.0 part dicyandiamide. Final product yellow and substantially insoluble in water.
F. 1.0 part urea. Final product orange and substantially insoluble in water.
G. 1.0 part thiourea. Final product orange and substantially insoluble in water.
H. 1.0 part gelatin. Final product yellow and insoluble in water.
I. Nothing added to the acetone resin solution. Final product water-white and very soluble in water.
J. 0.1 part NaOH added to acetone resin solution. Final product white and soluble in water.

What we claim is:

1. A composition comprising a water-soluble formaldehyde-hardenable nitrogenous body selected from the group consisting of melamine and partial condensation products of melamine with formaldehyde and, as a hardener therefor under the influence of heat, a water-soluble acetone resin consisting of the reaction product of 1 mole of acetone with about 6 moles of formaldehyde in the presence of borax as condensing agent, said resin containing the condensing agent.

2. A composition comprising melamine and, as a hardening agent therefor under the influence of heat, a water-soluble acetone resin consisting of the reaction product of 1 mole of acetone with about 6 moles of formaldehyde in the presence of borax as condensing agent, said resin containing the condensing agent.

3. A composition comprising a water-soluble partial condensation product of melamine with formaldehyde and, as a hardening agent therefor under the influence of heat, a water-soluble acetone resin consisting of the reaction product of 1 mole of acetone with about 6 moles of formaldehyde in the presence of borax as condensing agent, said resin containing the condensing agent.

4. An aqueous composition suitable for application to textile fabrics to produce a permanent finish thereon under those conditions wherein a fabric is impregnated and baked, comprising a water-soluble formaldehyde-hardenable nitrogenous body selected from the group consisting of melamine and partial condensation products of melamine with formaldehyde and, as a hardening agent therefor under the influence of heat, a water-soluble acetone resin consisting of the reaction product of 1 mole of acetone with 6 moles of formaldehyde in the presence of borax as a weakly alkaline condensing agent, said resin containing the condensing agent.

5. The process of making a composition which is capable of becoming insoluble and infusible under heat, which comprises incorporating a water-soluble formaldehyde-hardenable nitrogenous body selected from the group consisting of melamine and partial condensation products of melamine with formaldehyde, with a water-soluble acetone resin which consists of the reaction product of 1 mole of acetone and about 6 moles of formaldehyde in the presence of borax as a condensing agent, said resin containing the condensing agent.

6. The process of making a composition which is capable of becoming insoluble and infusible under heat, which comprises incorporating melamine, with a water-soluble acetone resin which consists of the reaction product of 1 mole of acetone and 6 moles of formaldehyde in the presence of borax as a condensing agent, said resin containing the condensing agent.

7. The process of making a composition which is capable of becoming insoluble and infusible under heat, which comprises incorporating a water-soluble partial condensation product of melamine with formaldehyde, with a water-soluble acetone resin which consists of the reaction product of 1 mole of acetone and 6 moles of formaldehyde in the presence of borax as a condensing agent, said resin containing the condensing agent.

FREDERICK A. HESSEL.
JOHN B. RUST.